INVENTOR.
JAMES HAMILTON
BY Martin Kalikow
ATTORNEY

April 14, 1959          J. HAMILTON          2,881,940
ENCLOSING CASE FOR ELECTRICAL OR OTHER APPARATUS
Filed Oct. 1, 1957                      2 Sheets-Sheet 2

INVENTOR.
JAMES HAMILTON
BY Martin Kalikow
ATTORNEY

United States Patent Office 2,881,940
Patented Apr. 14, 1959

2,881,940

ENCLOSING CASE FOR ELECTRICAL OR OTHER APPARATUS

James Hamilton, Normal, Ill., assignor to General Electric Company, a corporation of New York Application October 1, 1957, Serial No. 687,550

4 Claims. (Cl. 220—3.94)

My invention relates to metal enclosing cases for electrical, mechanical or electromechanical apparatus and to methods for making such metal enclosing cases.

Metal cases for apparatus ordinarily comprise rectangular metal boxes having integral top, bottom and opposite side walls, these walls extending to a height somewhat greater than that of an electrical apparatus intended to be enclosed therein. A generally flat cover plate is hinged or otherwise fastened to the upper edge portions of these side walls. In the usual way of making these rectangular boxes, a cross-shaped metal plate has four projecting sides which are bent upwardly, and then welded or otherwise permanently fastened together at the four corners. Such welding or other permanent fastening operations are time consuming and costly and do not easily lend themselves to mechanized assembly techniques. Alternativley sheet metal is blanked, drawn and trimmed with resultant waste and high tooling cost. The initial cross-shaped metal plate from which the box is formed may also result in considerable scrap of the metal strip from which it is blanked.

Once an electrical or other apparatus is mounted within such an enclosing case, accessibility to the four sides of the apparatus is greatly restricted by the four side walls of the enclosing case. Efforts to provide enclosing cases having greater accessibility to the sides of an enclosed electrical apparatus have heretofore resulted in constructions that were relatively weak, expensive, difficult to assemble, or unable to meet the electrical and mechanical safety requirements of the Fire Underwriters Laboratories.

Accordingly an important object of the invention is to provide a sturdy, safe yet inexpensive enclosing case for electrical or other apparatus having greater accessibility to the four sides of an enclosed apparatus and particularly to one pair of opposite sides thereof and providing also for ready disassembly or knockdown operation.

Another object of the invention is to provide a knockdown enclosing casing so fabricated that it substantially eliminates scrap, eliminates costly welding or other permanent fastening operations, utilizes only easily mechanized operations such as stamping and bending, and has an unusually simple assembly and disassembly.

In general an enclosing case embodying the invention comprises complementary U-shaped base and cover plate, each having its end portions bent into planes at right angles to its central portion whereby such ends form on each plate opposite partial end wall portions, and the U-shaped plates being assembled together in opposed complementary relation with said partial end wall portion in overlapping interfitting relation thereby to form the front, back, top and bottom walls of the case. A pair of flat side plates are disposed edgewise between the base and cover plates to form the opposite sides of the case. These side plates extend across the end wall junctures between the base and cover plates and are removable upon detachment of the cover plate. The removability of these side plates provides complete access to the lateral sides of an enclosed apparatus. The detachment of the cover plate from the base plate also provides considerable access to the opposite ends of an enclosed apparatus by virtue of the fact that the junctures between these strips are located intermediate the depth of the case from front to the back, and preferably closer to the back than to the front of the case.

In making this enclosing case, cooperating connectors are formed in the ends of two flat rectangular metal plates and the side edges of these flat plates are bent into planes at right angles to the plates to form side flanges thereon. The opposite end portions of each flanged plate are then bent into planes at right angles to its central portion to form U-shaped and side flanged structures constituting the base and cover plates of the case. Another pair of flat side plates are inserted edgewise into the base plate with the edges of each side plate in tight engagement with the three interior walls of base plate and bearing against one of its side flanges. The end portions of the cover plate (i.e. the partial end wall portions) are then fastened by means of the cooperating connectors to the end portions (i.e. partial end wall portions) of the base plate to complete the enclosure of the case and to trap the side plates against removal.

The novel constructions and methods believed characteristic of the invention are as set forth in the appended claims. The invention itself, however, together with further objects and advantages thereof, can be easily understood by reference to the following description taken in connection with the accompanying drawings, in which:

Figure 1:
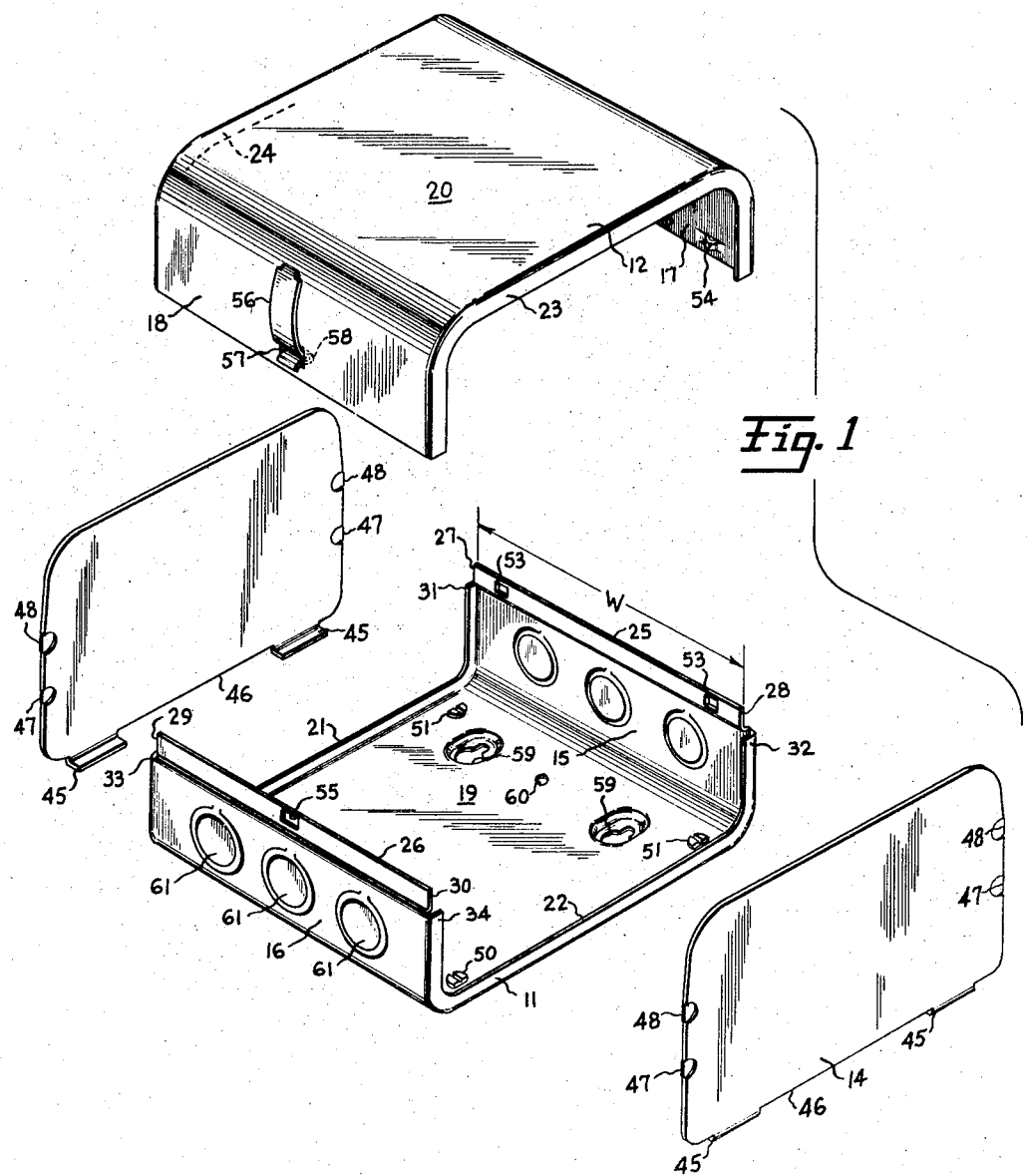
Figure 1 is an exploded perspective view of an enclosing case of the invention before assembly.
Figure 2:
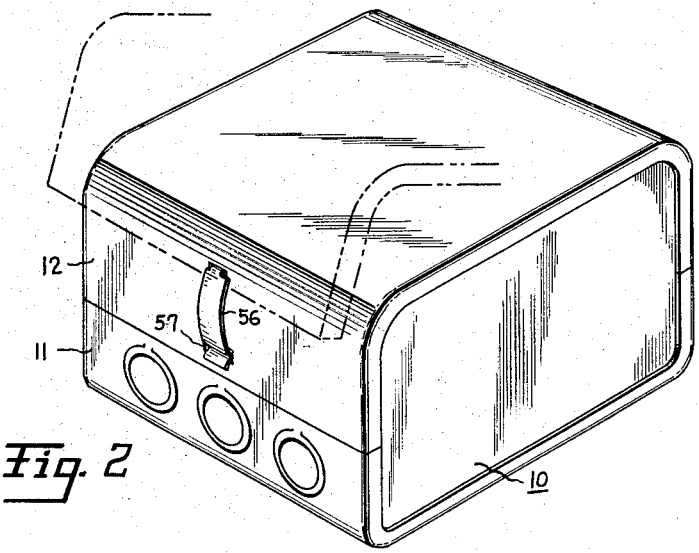
Figure 2 is a perspective view of the enclosing case of Figure 1 in assembled form.

Referring to Figures 1 and 2 an enclosing case 10 embodying one form of the invention comprises a pair of main housing members formed as U-shaped front and back plates 11 and 12 and a pair of flat side plates 13 and 14, all preferably but not necessarily formed of metal. The U-shaped plate 11 constitutes the back enclosure wall, while plate 12 constitutes the front wall or cover of the case 10. The opposite top and bottom wall portions 15, 16 of base plate 11 and the opposite top and bottom end wall portions 17, 18 of cover plate 12 are bent into planes substantially at right angles to the planes of the central portions 19 and 20 of the respective strips 11 and 12. The upwardly bent end portions 15 and 16 of back strip 11 are adapted to interfit in opposed overlapping relation with the downwardly bent end wall portions 17 and 18 of cover plate 12 in an easily dectachable manner to be more fully described hereinafter. When joined together, as shown in Figure 2, the U-shaped plates 11 and 12 thus form integral front and back walls and sectional top and bottom end walls of the enclosing case 10.

The U-shaped front and back plates 11 and 12 each have inturned, and preferably continuous, flanges 21, 22, 23 and 24 along the opposite side edges of each plate, the flanges extending to a relatively short height in planes at right angles to the main body of the plate. Back plate 11 also has a pair of inwardly offset end portions or lips 25 and 26 extending along the top and bottom end wall portions 15 and 16. The lips 25 and 26 terminate slightly short of the overall width W of back strip 11 such that the opposite ends 27 and 28 of lip 25 and the opposite ends 29, 30 of lip 26 are slightly spaced inward of the plate from the ends 31, 32, 33 and 34 of the side flanges 21, 22 respectively.

Side plates 13 and 14 are identical with one another, each rectangular in shape with rounded corners conforming to the bending arc of the rounded top and bottom corners of U-shaped front and back plates 11 and 12. Each side plate 13 and 14 has a pair of inturned ears 45, which alternatively may be formed as a single continuous flange, of short height extending from and substantially co-extensive with the bottom edge 46 of the plate. Two pairs of slight projections or teeth 47 and 48 are preferably formed in the opposite side edges of side plates 13 and 14 for a purpose to be described.

As shown in Figure 2 side plates 13 and 14 are supported by and fit snugly within the opposite sides of the U-shaped structure formed by the end and central portions 15, 16 and 19 of back plate 11. Side plates 13 and 14 each bear against the side flanges 21 and 22 of the back plate 11 with their own bottom flanges or ears 45 bearing against the back wall of the case formed by the central portion 19 of back plate 11. The side plates 13 and 14 are respectively retained against outward displacement by the central and end portions of flanges 21 and 22 and against inward displacement by the ends 27, 28, 29 and 30 of the inwardly offset end lips 25, 26. Teeth 47 of each plate 13, 14 bite into the sides of end wall portions 15 and 16 and insure the elimination of any sidewise play between the side plates and the back plate 11 regardless of any minor variations in the distance between the end wall portions 15 and 16 during manufacture. These teeth 47 and 48 also aid in grounding the side plates 13 and 14 to the front and back plates 11 and 12. Each of the side plates 13 and 14 is detachably restrained against forward disengagement and removal from back plate 11 by means of a pair of screws 50, 51 which are captive in central portion 19 of back plate 11 and whose semi-circular heads may be turned to overlie the ears 45 of each side plate. These screws 50 and 51 further provide for electrical grounding of side plates 13 and 14 to back plate 11. Plates 13 and 14 have a height dimension considerably greater than the upstanding end wall portions 15 and 16 of back plate 11 such that they protrude above these end wall portions when they are retained within this back plate 11.

The front U-shaped front plate or cover 12 is removably fastened to the back or base plate 11 by cooperating connectors forming detachable hinging means between their respective top wall portions 15 and 17 and forming latching means between their respective bottom wall portions 16 and 18. The detachable hinging means comprises a pair of spaced slots 53 in the offset lip 25 of back plate 11 and a correspondingly spaced pair of inwardly directed lances 54 along the lower edge of downwardly bent end wall portion 17 of front plate 12. These lances 54 may be hooked into slots 53 to form the hinged connection. Alternatively, a permanent hinge connection, not shown, may be made between top end portions 15 and 17.

The latching means between the bottom end wall portions 16 and 18 of plates 11 and 12 comprises a single slot 55 formed in offset lip 26 and a leaf spring latching member 56 attached to end wall portion 18 of front plate 12, and having its free end 58 arranged to pass through another slot 57 to snap within slot 55 when the two end wall portions 16 and 18 of the two strips are brought into slightly overlapped interfitting relation. It will be appreciated that when the side plates 13 and 14 are in place and the front plate 12 is fastened to the back plate 11, the enclosure is completed and the side plates are further supported against inward or outward displacement by the side flanges 23 and 24 of front plate 12. In addition, teeth 48 at each end of side plates 13 and 14 engage the inner surface of down turned ends 17 and 18 of plate 12 and prevent rattling.

Mounting holes 59 for the case 10 as well as mounting holes 60 for an enclosed apparatus are formed in the central portion 19 of base plate 11, while knockouts 61 are provided in the end wall portions 15 and 16. Similar knockouts may if desired be provided also in the side plates 13 and 14. The height of end wall portions 15 and 16 is preferably made as short as possible consistent with the provision for knockouts 61 and the proper support of side plates 13 and 14. This is because it has been found that the shorter the height of end portions 15 and 16, the greater the resistance which these end portions have toward outward bowing or other distortion. Such decreased height also provides greater accessibility to an enclosed apparatus when the cover plate 12 is removed.

In the manufacture of the enclosing case 10, flat metal strip material having a strip width substantially equal to the overall width of the front and back plates 11 and 12 are cut off at lengths substantially equal to the developed lengths of these plates 11 and 12 to form two flat rectangular plates. Hinge slots 53 and latch slot 55 are then stamped in the opposite ends of one plate while hinge lances 54 and latch slot 57 are stamped in the opposite end portions of the other plate. The side edges of each plate are bent to form flanges 21, 22, 23 and 24, and the mounting holes 59, 60, knockouts 61, and offset lips 25 and 26 are provided by a succession of stamping operations while these rectangular plates are still maintained flat. The end portions 15, 16, 17 and 18 are then formed by a simple bending of the end portions of these flanged and apertured plates into planes at right angles to their central portions thereby to form the channel-shaped or U-shaped base and cover plates 11 and 12. The latch member 56 may then be inserted within aperture 57 of cover plate 12, and the screws 50, 51 threaded within the central portion of base plate 11 and made captive thereto.

The side plates 13 and 14 are also stamped from flat metal strip material and the bottom ears 45 bent at right angles thereto by a simple stamping operation. The side plates 13 and 14 are then inserted within and removably fastened by screws 50, 51 to the U-shaped structure formed by the back plate 11. The front plate 12 is then fastened to the back plate in the manner described above to complete the assembly of the case.

Figure 3:
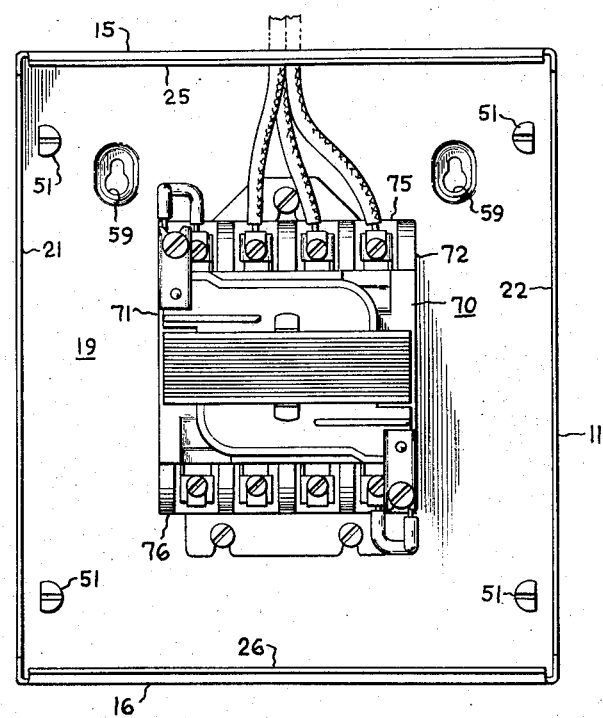
Figure 3 is a plan view of a typical electrical apparatus mounted in the back strip of the enclosing case of Figure 1 with the side plates and front strip removed.

Referring now to Figure 3, there is shown an electrical apparatus in the form of a magnetic contactor 70 mounted on the central portion 19 of base plate 11 with the side plates 13, 14 and cover plate 12 removed. It will be seen that one pair of opposite sides 71 and 72 of apparatus 70 are completely accessible by virtue of the removal of side plates 13 and 14. The other pair of opposite sides 75, 76 of apparatus 70 as well as the space between these sides and the end portions 15 and 16 is also readily accessible due both to the short height of the end wall portions 15 and 16 and to the open sides of the case resulting from the removal of side plates 13 and 14.

While I have described above particular embodiments of the invention, many modifications may be made; and it is to be understood that I intend by the appended claims to cover all such modifications as fall within the true spirit and scope of the invention.

What I claim as new and desire to secure by Letters Patent of the United States is:

1. A knockdown enclosing casing for electrical or other apparatus comprising a U-shaped base plate forming a back wall and a pair of opposite partial end walls of said casing, said base plate having inturned retaining flanges along the opposite side edges thereof and at least one said partial end wall having at its transverse edge an inwardly offset lip portion slightly spaced at its ends from said side retaining flanges, a pair of substantially flat side plates removably mounted perpendicular to said base plate and edgewise the back wall thereof between said partial end walls, each said side plate being disposed and held between one end of said offset lip and the adjacent said side retaining flange and extending forwardly beyond the partial end walls of said base plate, and a U-shaped cover plate removably mounted upon said base plate in face-to-face opposing relation thereof whereby the inturned ends of said cover plate constitute a second pair of opposite partial end walls to complete said casing.

2. A knockdown enclosing casing for electrical or other apparatus comprising a U-shaped base plate forming a back wall and a pair of opposite partial end walls of said casing, said base plate having inturned retaining flanges along the opposite side edges thereof and said partial end walls each having at its transverse edge an inwardly offset lip portion slightly spaced at its ends from the adjacent side retaining flange, a pair of substantially flat side plates removably mounted perpendicular to said base plate and edgewise against the back wall thereof between said partial end walls, each said side plate being disposed and held between one end of each said offset lips and said adjacent side retaining flange and extending forwardly beyond the partial end walls of said base plate, and a U-shaped cover plate removably mounted upon said base plate in face-to-face opposing relation therewith with its inturned ends constituting a second pair of opposite partial end walls overlying said offset lips in interfitting relation therewith to complete said casing.

3. A knockdown enclosing casing for electrical or other apparatus comprising a U-shaped base plate forming a back wall and a pair of opposite partial end walls of said casing, said base plate having inturned retaining flanges along the opposite side edges thereof and said partial end walls each having at its transverse edge an inwardly offset lip portion slightly spaced at its ends from the adjacent side retaining flange, a pair of substantially flat side plates removably mounted perpendicular to said base plate and edgewise against the back wall thereof between said partial end walls, each said side plate being disposed and held between one end of said offset lip and said adjacent side retaining flange and extending forwardly beyond the partial end walls of said base plate, a U-shaped cover plate removably mounted upon said base plate in face-to-face opposing relation therewith with its inturned ends constituting a second pair of opposite partial end walls overlying said offset lips in interfitting relation therewith to complete said casing, and detachable hinge means connecting said cover plate to one said lip of said base plate.

4. A knockdown enclosing casing for electrical or other apparatus comprising a U-shaped base plate forming a back wall and pair of opposite partial end walls of said casing, said base plate having inturned retaining flanges along the opposite side edges thereof and said partial end walls each having at its transverse edge an inwardly offset lip portion slightly spaced at its ends from the adjacent side retaining flange, a pair of substantially flat side plates removably mounted perpendicular to said base plate and edgewise against the back wall thereof between said partial end walls, each said side plate being disposed and held between one end of each said offset lip and said adjacent side retaining flange and extending forwardly beyond the partial end walls of said base plate, detachable connecting means between said side plates and said back wall of said base plate, a U-shaped cover plate forming a front wall and a second pair of opposite partial end walls of said casing and being inwardly flanged along opposite side edges thereof to overlie the front edges of said side plates, said cover plate being removably mounted upon said base plate in face-to-face opposing relation therewith with its partial end walls overlying said offset lips in interfitting relation, and detachable hinge means connecting said cover plate to one said lip of said base plate.

References Cited in the file of this patent
UNITED STATES PATENTS

| | | |
|---|---|---|
| 2,038,075 | Edwards | Apr. 21, 1936 |
| 2,059,671 | Steenweg | Nov. 3, 1936 |
| 2,457,023 | Zelt | Dec. 21, 1948 |
| 2,574,998 | Bangert | Nov. 13, 1951 |
| 2,665,353 | Popp | June 5, 1954 |
| 2,706,574 | Clement | Apr. 19, 1955 |
| 2,763,707 | Soderberg | Sept. 18, 1956 |